(12) United States Patent
Smith

(10) Patent No.: US 12,069,040 B2
(45) Date of Patent: Aug. 20, 2024

(54) CREDENTIAL DEPENDENCY ENCODING AND VERIFICATION BASED ON OTHER CREDENTIAL RESOURCES

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 531 days.

(21) Appl. No.: 16/957,693

(22) PCT Filed: Sep. 28, 2018

(86) PCT No.: PCT/US2018/053456
§ 371 (c)(1),
(2) Date: Jun. 24, 2020

(87) PCT Pub. No.: WO2019/172959
PCT Pub. Date: Sep. 12, 2019

(65) Prior Publication Data
US 2020/0366668 A1    Nov. 19, 2020

Related U.S. Application Data

(60) Provisional application No. 62/639,849, filed on Mar. 7, 2018.

(51) Int. Cl.
*H04L 9/40* (2022.01)
*H04L 67/142* (2022.01)
*H04L 67/02* (2022.01)

(52) U.S. Cl.
CPC .......... *H04L 63/0823* (2013.01); *H04L 63/20* (2013.01); *H04L 67/142* (2013.01); *H04L 67/02* (2013.01)

(58) Field of Classification Search
CPC ... H04L 63/0823; H04L 63/20; H04L 67/142; H04L 67/02; H04L 67/12; H04W 4/70
See application file for complete search history.

(56) References Cited

U.S. PATENT DOCUMENTS

2004/0088578 A1 * 5/2004 Chao ...................... H04L 63/205
726/6
2010/0082975 A1 * 4/2010 Metke ................... H04L 63/064
713/157

(Continued)

FOREIGN PATENT DOCUMENTS

WO    WO-2019172959 A1    9/2019

OTHER PUBLICATIONS

Xinyang Feng et al., "Research on Application of RDFa in RESTful Web Services," 2012, pp. 266-269. (Year: 2012).*

(Continued)

*Primary Examiner* — Luu T Pham
*Assistant Examiner* — Canh Le
(74) *Attorney, Agent, or Firm* — Schwegman Lundberg & Woessner, P.A.

(57) ABSTRACT

Various systems and methods of establishing and providing credential dependency information in RESTful transactions are described. In an example, accessing credential resource dependencies may be performed by a credential management service (CMS) or other server, with operations including: receiving a request for a credential resource in a Representation State Transfer (RESTful) communication; identifying the credential resource which has a credential path that indicates a dependency associated with a credential; identifying dependency characteristics of the credential resource, based on the dependency; populating the credential resource to include a dependent credential, based on the dependency characteristics; and transmitting the populated credential resource in response to the request. In further (Continued)

examples, the credential resource and the credential path within the credential resource may be established, such as by defining paths to trust anchor entries, or dependencies to a trusted computing key of a trusted computing module that attests to trust properties.

23 Claims, 9 Drawing Sheets

(56) References Cited

U.S. PATENT DOCUMENTS

| | | | |
|---|---|---|---|
| 2013/0151552 A1* | 6/2013 | Sugawara | G06F 16/958 707/769 |
| 2013/0160101 A1* | 6/2013 | Hakola | H04L 63/0823 726/7 |
| 2013/0246646 A1* | 9/2013 | Iliev | H04L 69/22 709/232 |
| 2014/0281502 A1* | 9/2014 | Keung Chan | H04L 9/3265 713/157 |
| 2015/0381776 A1 | 12/2015 | Seed et al. | |
| 2016/0277391 A1* | 9/2016 | Choyi | H04L 63/062 |
| 2016/0366183 A1* | 12/2016 | Smith | H04L 63/06 |
| 2017/0302459 A1* | 10/2017 | Fenner | H04L 9/3234 |
| 2018/0004503 A1* | 1/2018 | OlmstedThompson | H04L 67/02 |

OTHER PUBLICATIONS

Andrzej Stroiriski et al.,. "RESTful Web Service Mining: simpe algorithm supporting resource-oriented systems," 2014, pp. 694-695. (Year: 2014).*

"International Application Serial No. PCT/US2018/053456, International Search Report mailed Jan. 7, 2019", 4 pgs.

"International Application Serial No. PCT/US2018/053456, Written Opinion mailed Jan. 7, 2019", 7 pgs.

"International Application Serial No. PCT US2018 053456, International Preliminary Report on Patentability mailed Sep. 17, 2020", 9 pgs.

* cited by examiner

CREDENTIAL DEPENDENCY ENCODING AND VERIFICATION BASED ON OTHER CREDENTIAL RESOURCES

PRIORITY CLAIM

This application is a U.S. National Stage Application under 35 U.S.C. 371 from International Application No. PCT/US2018/053456, filed Sep. 28, 2018, published as WO 2019/172959, which claims the benefit of priority to U.S. Provisional Patent Application Ser. No. 62/639,849, filed Mar. 7, 2018, and titled "CREDENTIAL DEPENDENCY ENCODING IN RESTFUL SYSTEM BASED ON RESOURCES", all of which are which is incorporated herein by reference in their entirety.

TECHNICAL FIELD

Embodiments described herein generally relate to data communications and interconnected device networks, and in particular, to credential dependency encoding in a Representational State Transfer (RESTful) system based on resources.

BACKGROUND

Hyper Text Transfer Protocol (HTTP) is a stateless communications protocol underlying many Internet technologies, such as the World Wide Web. The RESTful, or REST, architecture extends HTTP with conventions to improve performance, scalability, portability, or reliability of, and provide a uniform data interface for. HTTP connections. Formal RESTful constraints include a client-server architecture, statelessness, cacheability, a layered system, a uniform interface-which includes resource identification in requests, resource manipulation through representations, and self-descriptive messages—and optionally code on demand. Generally, these constraints permit accessing an object via a formalized uniform resource identifier (URI) and an HTTP method. For example, to delete a user object identified as "UserA", the URI http://api.somesite.com/users/UserA may be used with the HTTP method DELETE.

IoT devices are physical or virtualized objects that may communicate on a network, and may include sensors, actuators, and other input/output components, such as to collect data or perform actions from a real world environment. For example. IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

IoT systems that rely on RESTful interface semantics to manage credentials have a need to represent dependencies among other credentials. For example, RESTful requests to obtain a credential may implicitly, or explicitly, require additional, dependent credentials to be returned in a request along with the originally requested credential. Additionally, servers implementing an IoT Resource model may need to identify dependent credentials for local processing of a credential.

Resource models for credentials have typically not captured dependency semantics. Thus, although credential dependencies are semantic in nature, unless the resource model captures dependency semantics, external mechanisms are used to perform semantic entailment processing. Because this occurs outside the resource interaction model, communication inefficiencies are common. For example, without a credential dependency extension in the resource model, the client or server must rely on context information that exists outside the resource model to supply the dependency semantics, with all of the accompanying signaling overhead to synchronize and query the outside context. Furthermore, the RESTful interaction model may be required to perform piecemeal parsing of resources followed by subsequent RESTful interactions in order to obtain all dependent credentials.

To address the issues noted above, a credential dependency extension to the credential resource is described. This extension may be used by the server or client to automatically include credential dependency data into a RESTful request or response. In an example, the extension enables credential dependency semantics to be included in the credential resource using a credential path (CredPath) property. In an example, this CredPath serves as a pointer to an applicable credential. When a CredPath property is populated, the dependent credential is found within the credential resources collection and returned as part of a RESTful request. Additional examples and details are provided below.

Figure 1:
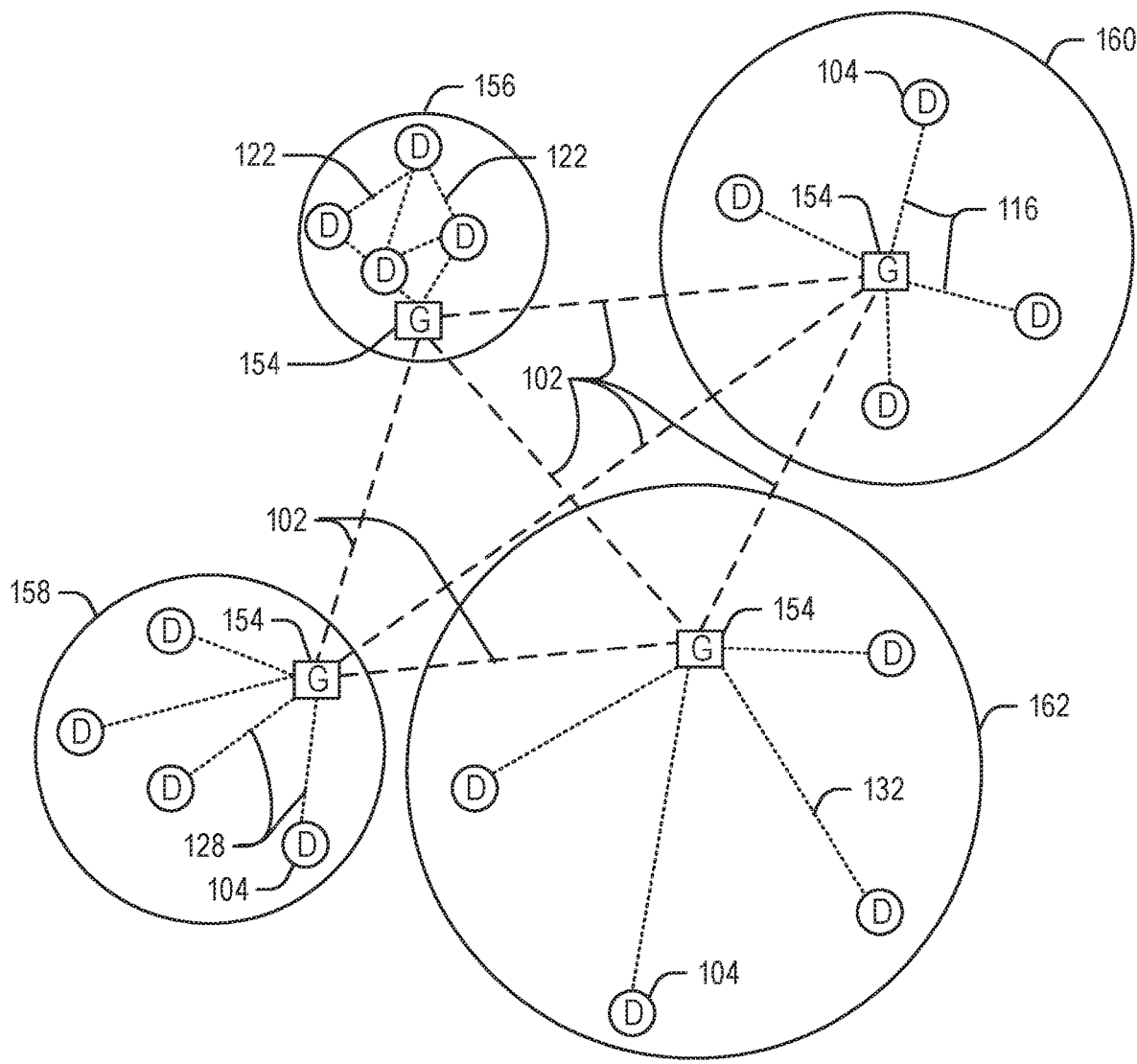
FIG. 1 illustrates a domain topology for respective internet-of-things (IoT) networks coupled through links to respective gateways, according to an example.

FIG. 1 illustrates an example domain topology for respective IoT networks coupled through links to respective gateways. The IoT supports deployments in which a large number of computing devices are interconnected to each other (and to the Internet) to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
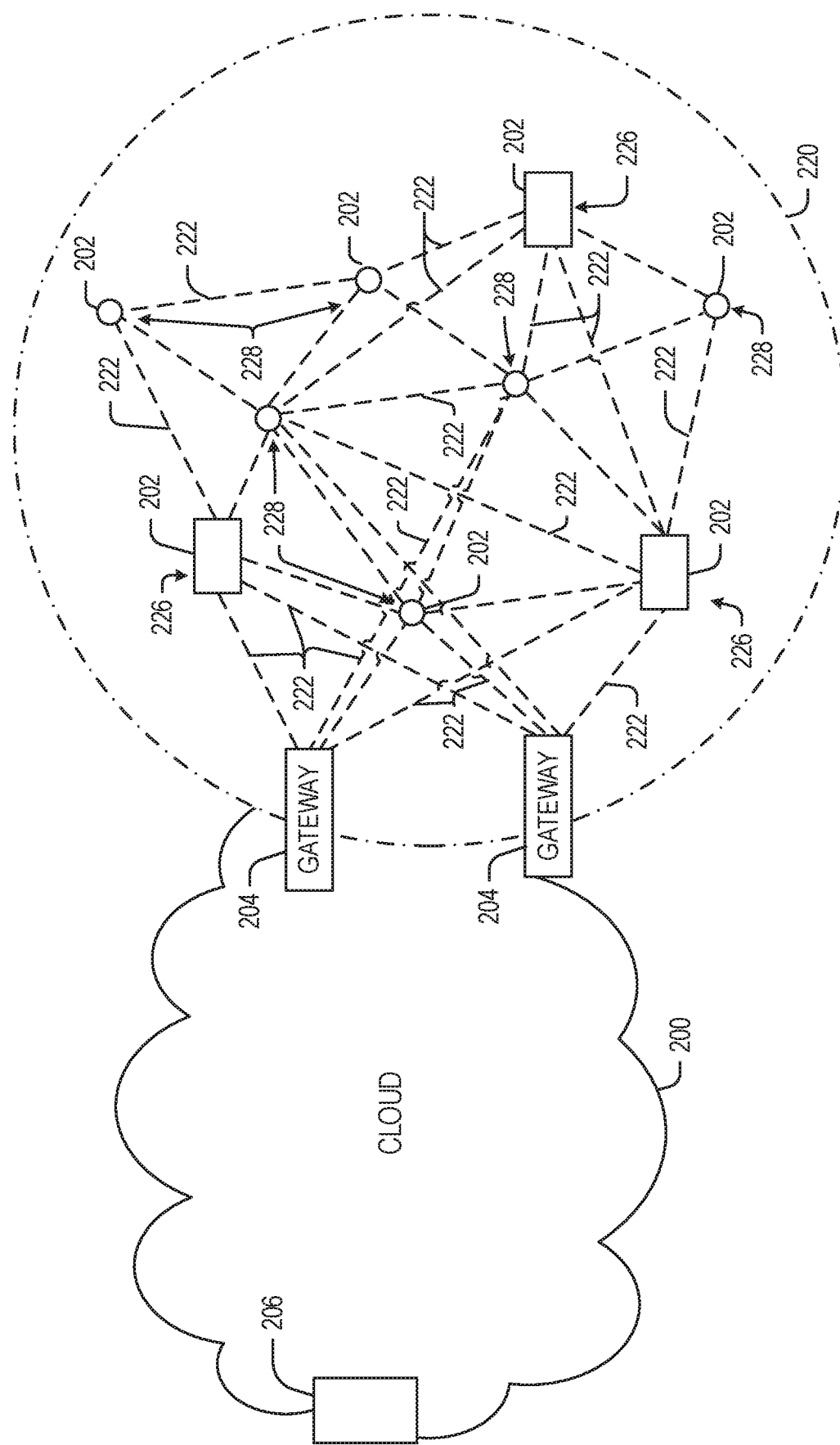
FIG. 2 illustrates a cloud-computing network in communication with a mesh network of IoT devices operating as a fog device at the edge of the cloud-computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, or vibration into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure- and resource-based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 8 and 9.

In still further examples, aspects of network virtualization and virtualized/software-based functional management, including software defined networking (SDN), may be implemented with the networks 158, 160, 162, or other entities. For instance, SDN may provide a software-based programmable network that separates the control plane from the data plane to make the network and network functions more flexible, agile, scalable, and less dependent on networking equipment, vendors, and service providers. Other use cases of SDN features may involve dynamic network configurations, monitoring, and the abstraction of network functions in virtualized and dynamic systems, for redundancy, control, and improved performance.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundationm (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and enabling the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, enabling communications to be maintained, even with the loss of a number of IoT devices 202. Further, the use of a mesh network may enable IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

In an OCF architecture, entities in the real physical world (e.g., a temperature sensor) are represented as resources. Interactions with entities are implemented through resource representations, which use operations that adhere to Representational State Transfer (REST) architectures, e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE, RETRIEVE, UPDATE, DELETE, and NOTIFY (CRUDN)).

As discussed herein, the following techniques may be implemented in connection with use of various OCF services, including DOTS (also known as DOXS, Device Owner Transfer Service). In a further example, the following techniques may be implemented in connection with an onboarding tool (OBT). In the context of an OCF implementation, an OBT is a logical entity within a specific IoT network that establishes ownership for a specific device and helps bring the device into operational state within that network. For instance, a typical OBT may implement DOTS, AMS (Access Management Service), and CMS (Credential Management Service) functionality.

Figure 3:
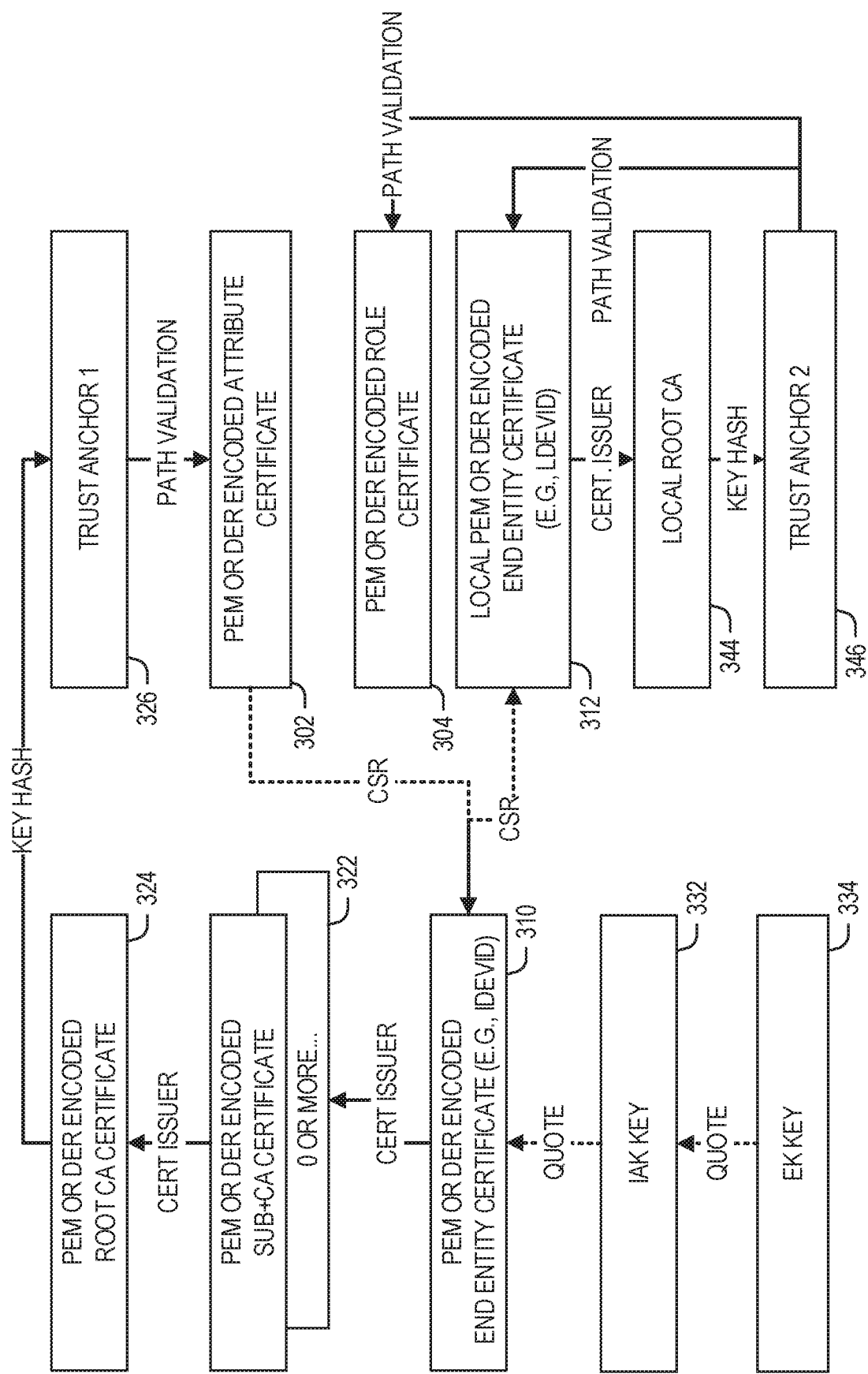
FIG. 3 illustrates an example of a credential dependency scenario involving certificates, trust anchors, and symmetric key credentials, according to an example.

FIG. 3 illustrates an example credential dependency scenario involving certificates, trust anchors, and symmetric key credentials, for use with an end-entity. An end-entity may be defined as a certificate holder who is not a root or an intermediate certificate authority (typically, a device certificate).

An end-entity certificate 310, 312 often depends on an issuing (sub-certificate authority (CA) (Sub-CA)) entity that may further identify the context in which the end-entity operates. For example, this context may identify a local deployment of IoT devices in a network or a manufacturing certificate used to on-board an IoT device or to transfer ownership of the device to a new owner or entity. As an example, an onboarding implementation (such as an Intel® Secure Device Onboarding (SDO) system implementation) may sign a manifest structure using a key issued by a Sub-CA.

FIG. 3 further illustrates Sub-CA credentials 322 depending on root-CA credentials 324, 344 and the root-CA credentials 324, 344 depending on trust-anchor credentials 326, 346. Trust anchor relationships thus indicate when a path validation dependency exists.

Additionally, key provenance may be available showing how a key (e.g., key 332, 334) is protected using hardened storage or trusted platform modules. These relationships are shown in terms of keys that may be quoted by other keys that are bound to the trusted storage module. Provenance keys and related certificates may further be used in certificate signing requests to further protect and inform certificate issuance.

Other credentials in an IoT resource model may depend on an end-entity credential that may digitally sign the credential. For example, an attribute or role certificate 302, 304 may be signed by an end-entity certificate 310, 312. A wrapped symmetric key credential may be signed by the end-entity certificate 310, 312 as well. These and other dependencies exist among credential resources found in an IoT Resource model such as those defined by the Open Connectivity Foundation (OCF) and by the Light Weight Machine to Machine (LWM2M) protocol.

In an example, for every key that may be an end-entity key (e.g., a key that may be used to perform a cryptographic operation), there may be a trusted computing key that attests to the trust properties of that key. Attestation keys may be bound to a trusted computing or storage modules (e.g., IP blocks in the hardware) where manufacturing certificates may be issued by module and platform manufacturers to identify the party or parties responsible for manufacturing the product. Hence, for a given end-entity key, there may be at least two related root CAs: (1) the root CA for the local entity that issues a local end-entity certificate and (2) the manufacturing root CA that establishes key protection provenance using attestation keys.

Often, attestation keys are used during end-entity certificate issuance (CSR) requests to prove the trustworthiness of the end-entity certificate key. The issuer may verifier the key provenance certificate chain and terminate with a trusted manufacturing root CA. The model may be even more complicated when a platform attribute certificate (or other signed document such as Signed XML, CMS, JWT, or CWT, etc.) is used to assert additional trust attributes associated with a platform but where an additional device identity is not asserted. The platform attribute certificate may be rooted by yet a third, fourth, fifth, etc. root CA(s). The platform certificates may also be supplied to CSR requests and verified by the issuing CA.

In an example applicable to an OCF implementation, a reason property may be used. The reason property may be defined as a property that captures a type of dependency. In an example, the dependency reason may be used by an OCF client to form a query that requests the "certificate path" or the "device ID provenance path" or the "platform trust attributes path". In another example, the dependency reason may be used by an OCF client to request only a single cred entry containing the CredPath and reason properties, leaving the decision to traverse the path up to the client for a subsequent RESTful call. The CredPath and reason properties enable capturing all of the various credential dependency graphs and relationships that may exist in an OCF credential resource.

Figure 4:
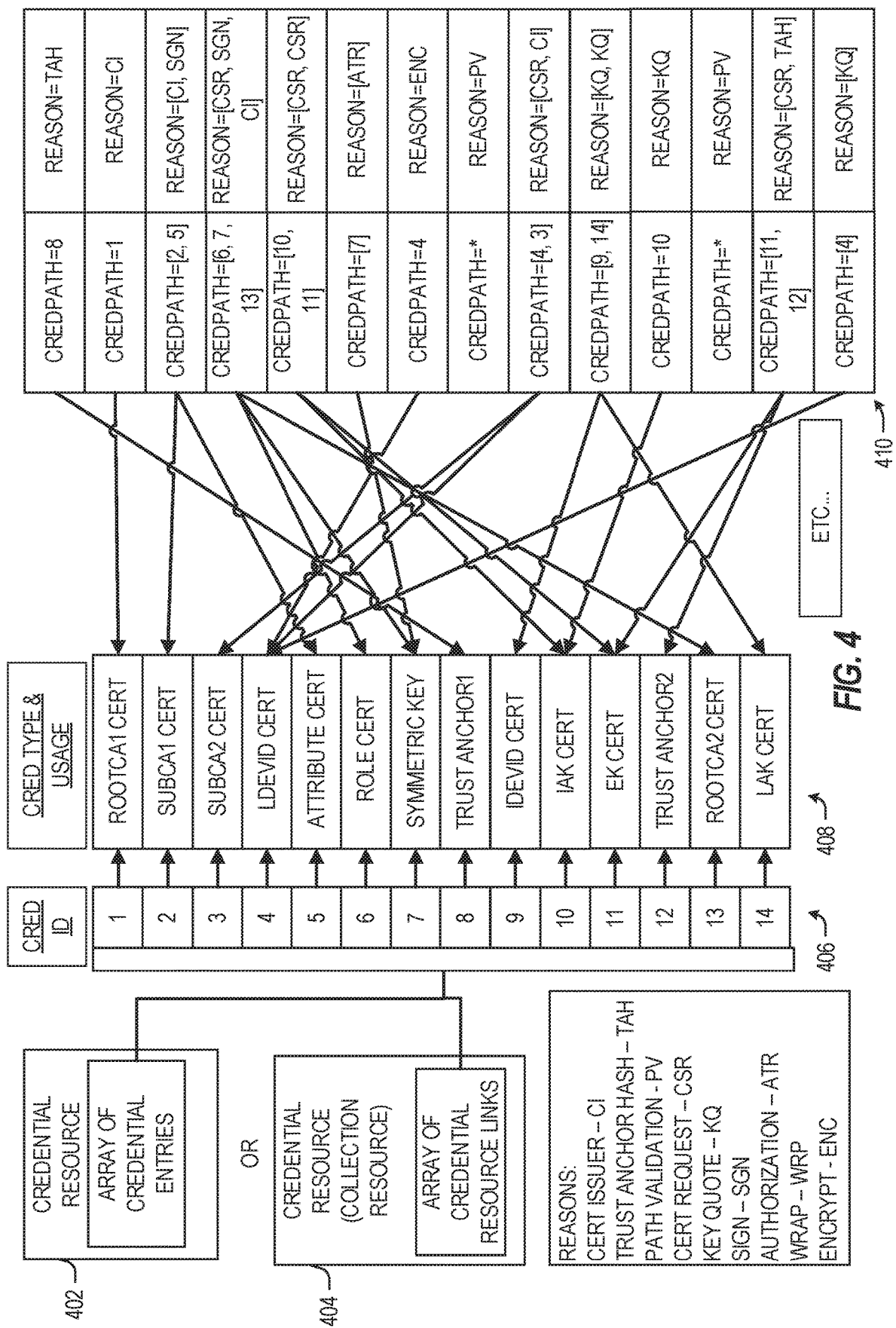
FIG. 4 illustrates an example of a credential resource where a collection of credential resources or credential entries are represented, according to an example.

FIG. 4 illustrates an example breakout of a credential resource 402 (or credential collection resource 404) where a collection of credential resources (or credential entries in an array) are represented. Credential resources may have a set of properties 408 providing contextual information that includes the resource identifier 406 and the properties 408 describing its intended use and format. The credential resource entry may be further encoded using encoding standards that are proprietary or otherwise accepted by the industry. Industry or vendor specific encoder or decoder tools may 'unpack' the structures to reveal hidden dependencies. These are costly operations that should be performed a minimum number of times.

In an example, the structures may be 'unpacked' once and then credential interdependencies may be represented within the IoT Resource model using the CredPath property (as shown in representation 410). The CredPath is a local reference (Cred ID) to other credentials in the Resource. Whenever a credential dependency is discovered, the CredPath is updated to identify its dependent peer credential. In an example, the order of values in the CredPath property captures the path sequence, and likewise, the reason property ordering corresponds to the CredPath ordering.

In most cases dependency semantics are either one-to-one or one-to-many. Many-to-many dependencies may be rare. FIG. 4 illustrates how one-to-one and one-to-many semantics may be represented using a single CredPath property associated with each credential entry. Many-to-many dependencies may be handled with an array of CredPath entries.

A dependency graph may be constructed by recursively following the dependency links for each credential entry. Dependencies may be circular, however, trust anchor entries may be reasonable halting points for the recursion. In an example, a "certificate pinning" use can be implemented by creating multiple trust anchor entries in the properties 408 where a first trust anchor is root CA and a second trust anchor is a sub-CA, etc. A CredPath entry for each property might reveal sequences that are the same, except the topmost value is omitted as path validation is pinned closer to the endpoint credential.

Thus, an additional request or response attribute—the credential path (e.g., CredPath) discussed herein-provides a pointer to another credential that may be used to provide the missing credential dependency semantics from other systems. This path allows a server, or client, to represent the mapping between credentials and track the relationship between everything as a more efficient way to manage credential dependencies. In a further example, a credential path option may be used in a query string. A request with a query string may operate such that, when a query occurs, a list of certificates that are involved in the dependency graph is received as opposed to a single certificate.

Although IoT devices communicating via OCF are described herein, these credential dependency semantics may be used by other protocols that use similar resource or object models for tracking credentials.

Figure 5:
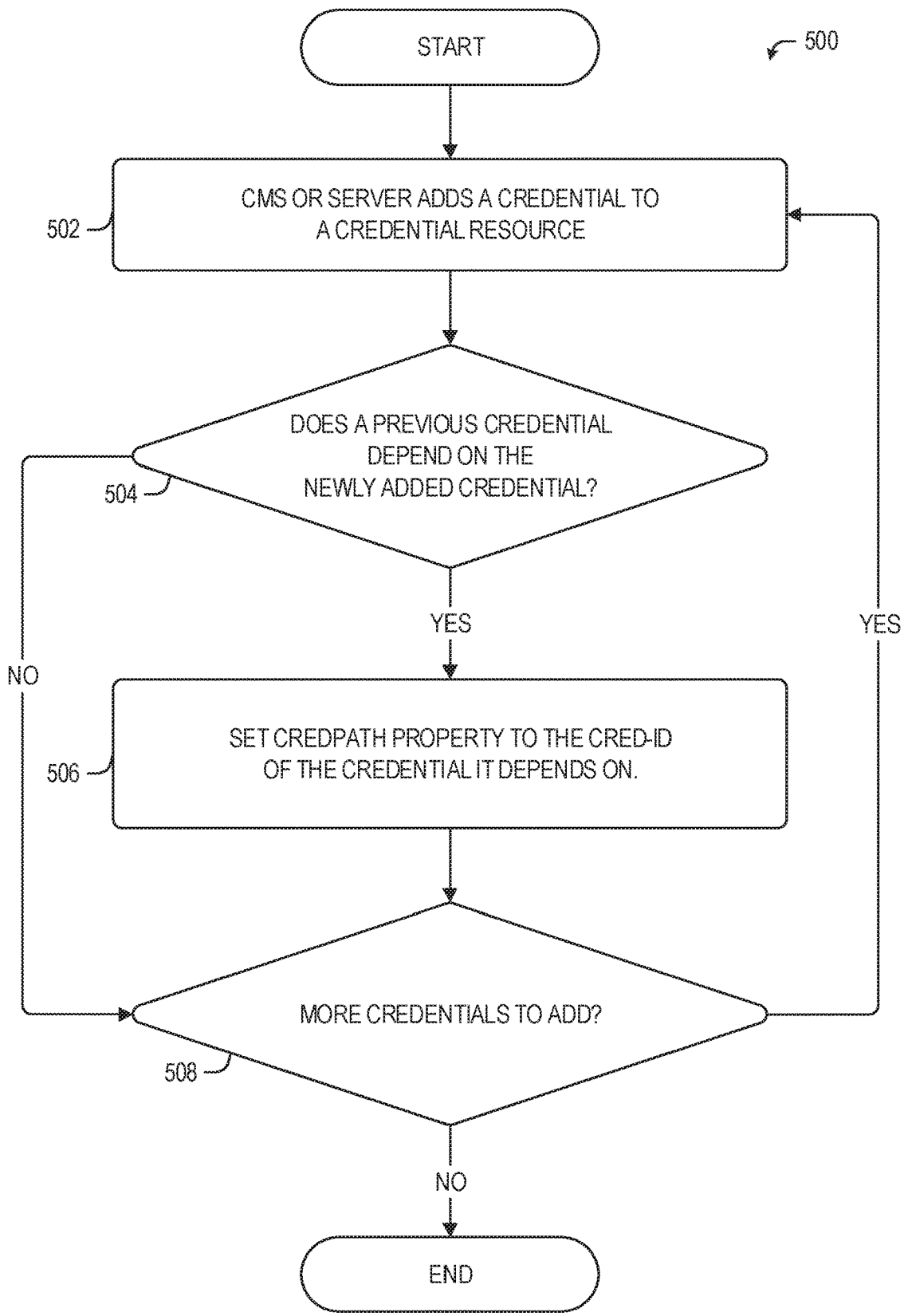
FIG. 5 illustrates an example of a method for finding and updating credential dependency semantics when a credential is inserted into a credentials resource, according to an example.

FIG. 5 illustrates a flowchart 500 of an example method for finding and updating credential dependency semantics when a credential is inserted into a credential resource. In this flowchart. "CRED-ID" stands for credential identifier and "CREDPATH" stands for credential path (e.g., CredPath).

In an example, the illustrated method of the flowchart 500 is performed by an OCF Credential Management Service (CMS). In another example, the illustrated method is performed by a server, or other entity that has access to the credential structures.

The flowchart 500 commences at 502 with the CMS or the server adding a credential to a credential resource. The flowchart 500 continues with an evaluation at 504 of whether a previous credential depends on the newly added credential. If the previous credential has this dependency, the credential path (CREDPATH) property is established at 506 to the identifier (CRED-ID) of the credential that it depends on. This is followed by a determination at 508 to identify additional credentials to add.

Figure 6:
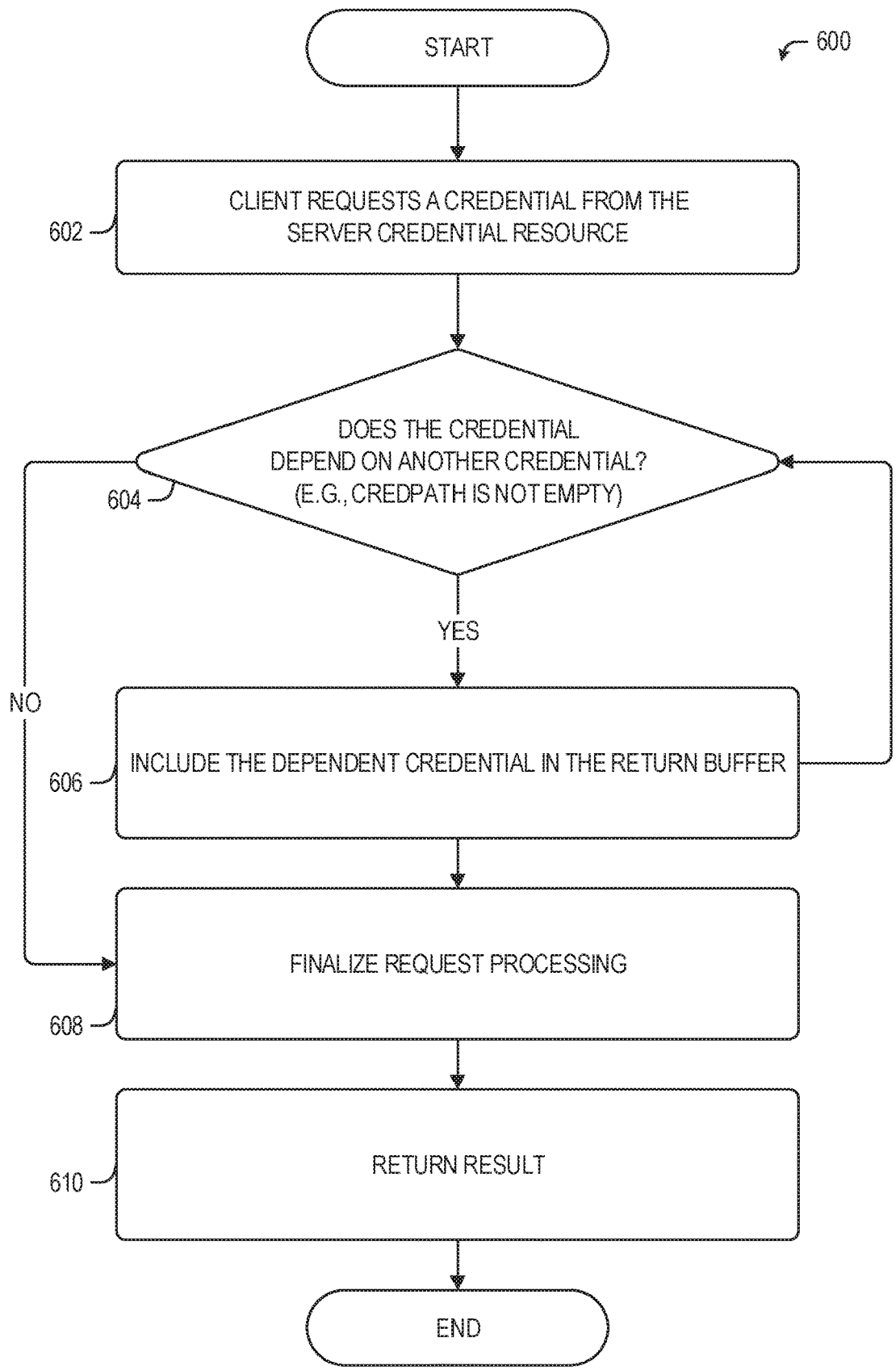
FIG. 6 illustrates a flowchart of a method for processing a RESTful request where a requested credential is found to have semantically dependent credentials, according to an example.

FIG. 6 illustrates a flowchart 600 of an example method for processing a RESTful request where a requested credential is found to have semantically dependent credentials. In an example, the dependents may automatically be included in the RESTful request as the requestor may be required to process them in context.

The flowchart 600 commences at 602 with the receipt, at a server, of a request for a particular credential from a credentials resource. This is followed by a determination at 604 of whether the credential depends on another credential. For instance, this dependency may be determined based on whether the credential path (CREDPATH) value is empty. If a dependency exists, then an operation is performed at 606 to include the dependent credential in the return buffer for the request. The flowchart 600 then concludes to finalize request processing in the server at 608, and return the result at 610 for the credential.

Different embodiments may enable fine grained control. In an example, a requestor may define an interface that returns only the requested resource or may return the semantically dependent resources. For example, the OCF resource model allows multiple interface typology such as "if"="sensor" for read-only and "if"="batch" for resources with collection semantics. An interface type of "if"="entailment" may be defined where resources with semantic dependencies are also returned.

Figure 7:
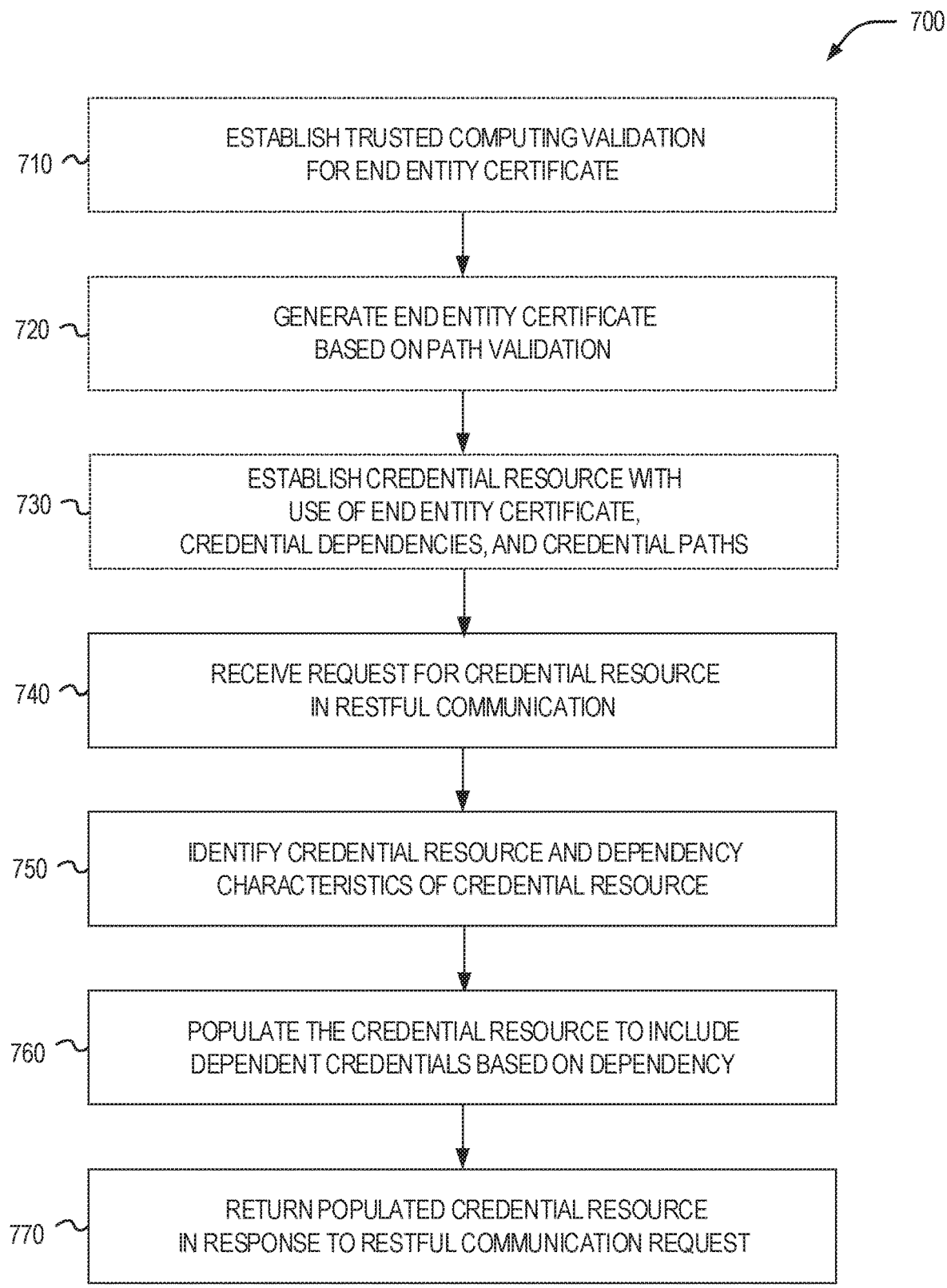
FIG. 7 illustrates a flowchart of a method for establishing and obtaining credential resources that are accessible with RESTful request, according to an example.

FIG. 7 illustrates a flowchart 700 of an example method for establishing and obtaining credential resources that are accessible with RESTful requests. In this flowchart 700, operations 710-730 are provided for establishing the credential resources, and operations 740-770 are provided for identifying and obtaining the credential resources. In an example, the operations are performed as operations of a Credential Management Service (CMS), with the CMS operating according to an Open Connectivity Foundation (OCF) specification (e.g., based on OCF Specification version 2.0, dated Jun. 21, 2018, or an equivalent earlier or later released version configuration). It is understood that the establishing and obtaining operations may be performed by the same or different systems or entities, and additional operations for establishing or obtaining may be performed by the same or different systems or entities.

The flowchart 700 begins at 710 with precondition operations to establish a trusted computing validation for an end entity certificate, and continues at 720 with operations to generate an end entity certificate based on path validation. Accordingly, any number of credential verifications and establishment operations for a device (or set of devices, or device components) may be performed to set up the credential operations.

The flowchart 700 then continues with precondition operations at 730 to establish the credential resource based on the use of the end entity certificate, applicable credential dependencies, and credential paths which specify the applicable credential dependencies. In an example, the credential paths are established to include one or more paths defined for applicable credential properties. In a further example, the credential paths are established to include multiple link dependencies to trust anchor entries, such that the one or more paths define the multiple link dependencies to the trust anchor entries.

The flowchart 700 continues at 740 with operations to respond to a request for a credential resource, as provided in a RESTful communication. Based on this request, the following operations 750-770 may be used to identify, populate, and return the credential resource including applicable dependent credentials. In an example, this request may include a query for a specific credential path or credential characteristics, so that the applicable dependent credentials identified and included in the credential resource are selected based on this query.

The flowchart 700 continues at 750 with operations to identify the applicable credential resource for the request, and identify dependency characteristics of the applicable credential resource. In an example, the credential resource includes an array including or otherwise linked to a plurality of credential entries, and the plurality of credential entries are linked to a plurality of credentials identified in a credential path. In another example, the credential resource is a collection resource that includes an array of credential resource links, and the respective credential resource links are linked to a plurality of credential identified in a credential path.

In an example, the operations of identifying the dependency characteristics of the credential resource include identifying a plurality of credential dependencies indicated in the credential path, such as for a scenario where the credential path includes references to respective credentials of the credential dependencies. Also in an example, the dependency characteristics include reason properties for respective dependent credentials, and the reason properties indicate an intended use and format of the respective dependent credentials.

The flowchart 700 continues with operations at 760 to populate the credential resource to include applicable dependent credentials, based on the identified dependency (and the identified dependency characteristics). In an example, the dependency characteristics are produced based on an end-entity credential that depends on a sub-certificate authority credential; further, in this example, the sub-certificate authority credential depends on a root-certificate authority credential. As a result, the dependent credential resource that is selected and populated into the credential resource may be selected using one of more of these credential resources (and any qualified query or criteria).

The flowchart 700 concludes with operations at 770 to return the populated credential resource, as a response to the RESTful communication request. In an example, the credential resource is populated to include an end-entity key, and the dependency indicated in the credential path is linked to or otherwise corresponds to a trusted computing key of a trusted computing module that attests to trust properties of the end-entity key. Thus, the returned credential resource may include appropriate dependent credentials usable to attest and verify the trust state of a particular resource, service, device component, or device.

In an example, the operations and functionality described above with reference to FIGS. 3 to 7 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a machine in the form of a computer, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 8:
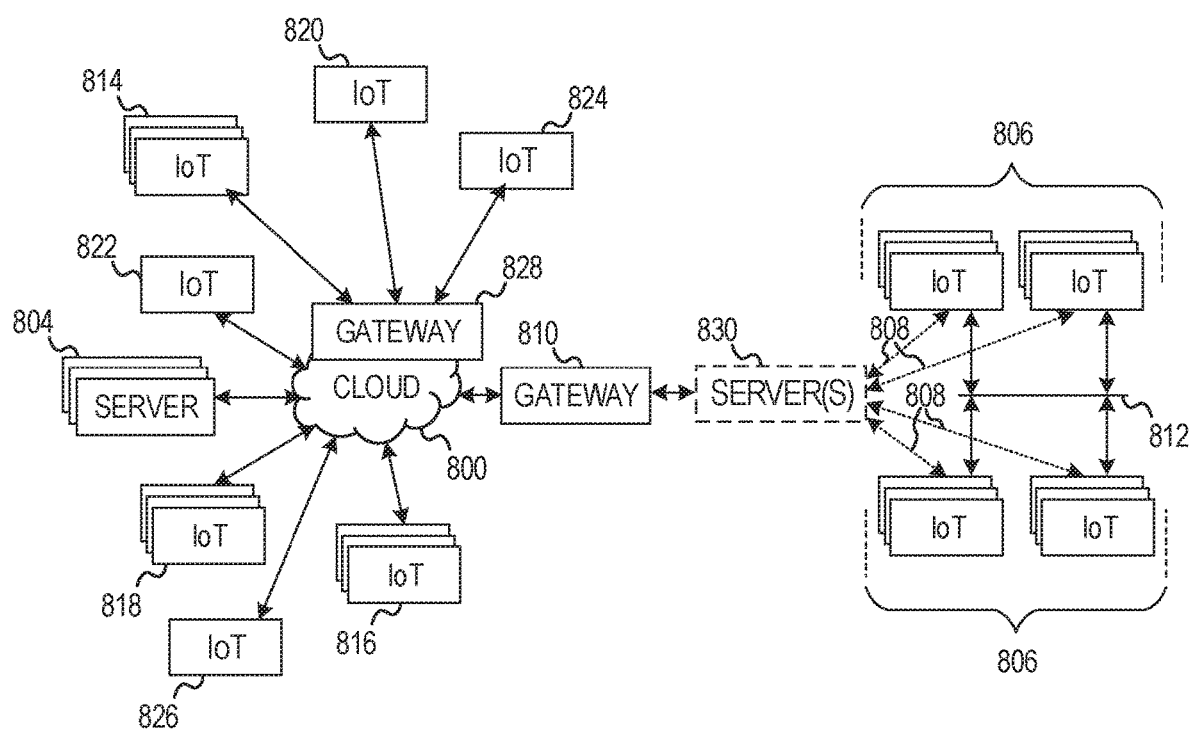
FIG. 8 illustrates a block diagram of a network illustrating communications among a number of IoT devices, according to an example.

FIG. 8 illustrates a drawing of a cloud computing network, or cloud 800, in communication with a number of Internet of Things (IoT) devices. The cloud 800 may represent the Internet, or may be a local area network (LAN), or a wide area network (WAN), such as a proprietary network for a company. The IoT devices may include any number of different types of devices, grouped in various combinations. For example, a traffic control group 806 may include IoT devices along streets in a city. These IoT devices may include stoplights, traffic flow monitors, cameras, weather sensors, and the like. The traffic control group 806, or other subgroups, may be in communication with the cloud 800 through wired or wireless links 808, such as LPWA links, optical links, and the like. Further, a wired or wireless sub-network 812 may allow the IoT devices to communicate with each other, such as through a local area network, a wireless local area network, and the like. The IoT devices may use another device, such as a gateway 810 or 828 to communicate with remote locations such as the cloud 800; the IoT devices may also use one or more servers 830 to facilitate communication with the cloud 800 or with the gateway 810. For example, the one or more servers 830 may operate as an intermediate network node to support a local edge cloud or fog implementation among a local area network. Further, the gateway 828 that is depicted may operate in a cloud-to-gateway-to-many edge devices configuration, such as with the various IoT devices 814, 820, 824 being constrained or dynamic to an assignment and use of resources in the cloud 800.

Other example groups of IoT devices may include remote weather stations 814, local information terminals 816, alarm systems 818, automated teller machines 820, alarm panels 822, or moving vehicles, such as emergency vehicles 824 or other vehicles 826, among many others. Each of these IoT devices may be in communication with other IoT devices, with servers 804, with another IoT fog platform or system (not shown, but depicted in FIG. 2), or a combination therein. The groups of IoT devices may be deployed in various residential, commercial, and industrial settings (including in both private or public environments).

As may be seen from FIG. 8, a large number of IoT devices may be communicating through the cloud 800. This may allow different IoT devices to request or provide information to other devices autonomously. For example, a group of IoT devices (e.g., the traffic control group 806) may request a current weather forecast from a group of remote weather stations 814, which may provide the forecast without human intervention. Further, an emergency vehicle 824 may be alerted by an automated teller machine 820 that a burglary is in progress. As the emergency vehicle 824 proceeds towards the automated teller machine 820, it may access the traffic control group 806 to request clearance to the location, for example, by lights turning red to block cross traffic at an intersection in sufficient time for the emergency vehicle 824 to have unimpeded access to the intersection.

Clusters of IoT devices, such as the remote weather stations 814 or the traffic control group 806, may be equipped to communicate with other IoT devices as well as with the cloud 800. This may allow the IoT devices to form an ad-hoc network between the devices, allowing them to function as a single device, which may be termed a fog platform or system (e.g., as described above with reference to FIG. 2).

Figure 9:
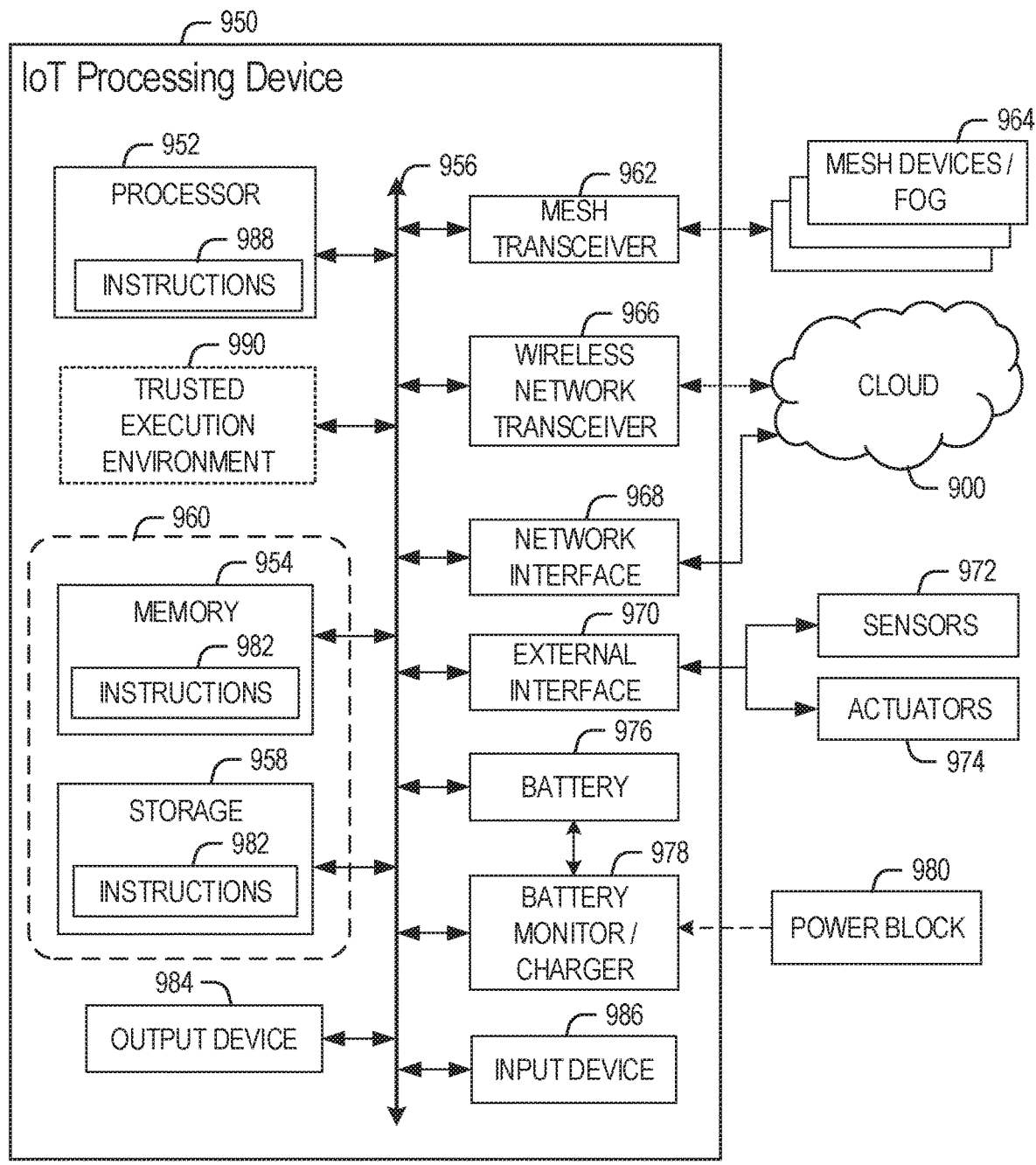
FIG. 9 illustrates a block diagram for an example IoT processing system architecture upon which any one or more of the techniques (e.g., operations, processes, methods, and methodologies) discussed herein may be performed.

FIG. 9 is a block diagram of an example of components that may be present in an IoT device 950 for implementing the techniques described herein. The IoT device 950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 950, or as components otherwise incorporated within a chassis of a larger system. Additionally, the block diagram of FIG. 9 is intended to depict a high-level view of components of the IoT device 950. However, some of the components shown may be omitted, additional components may be present, and different arrangement of the components shown may occur in other implementations.

The IoT device 950 may include processing circuitry in the form of a processor 952, which may be a microprocessor, a multi-core processor, a multithreaded processor, an ultra-low voltage processor, an embedded processor, or other known processing elements. The processor 952 may be a part of a system on a chip (SoC) in which the processor 952 and other components are formed into a single integrated circuit, or a single package, such as the Edison™ or Galileo™ SoC boards from Intel. As an example, the processor 952 may include an Intel® Architecture Core™ based processor, such as a Quark™, an Atom™, an i3, an i5, an i7, or an MCU-class processor, or another such processor available from Intel® Corporation. Santa Clara. California. However, any number other processors may be used, such as available from Advanced Micro Devices. Inc. (AMD) of Sunnyvale, California a MIPS-based design from MIPS Technologies, Inc. of Sunnyvale. California, an ARM-based design licensed from ARM Holdings. Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example the storage 958 may be implemented via a solid state disk drive (SSDD). Other devices that may be used for the storage 958 include flash memory cards, such as SD cards, microSD cards, xD picture cards, and the like, and USB flash drives. In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx). PCI express (PCIe), or any number of other technologies. The interconnect 956 may be a proprietary bus, for example, used in a SoC based system. Other bus systems may be included, such as an 12C interface, an SPI interface, point to point interfaces, and a power bus, among others.

The interconnect 956 may couple the processor 952 to a mesh transceiver 962, for communications with other mesh devices 964. The mesh transceiver 962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 964. For example, a WLAN unit may be used to implement Wi-Fi™ communications in accordance with the Institute of Electrical and Electronics Engineers (IEEE) 802.11 standard. In addition, wireless wide area communications. e.g., according to a cellular or other wireless wide area protocol, may occur via a WWAN unit.

The mesh transceiver 962 may communicate using multiple standards or radios for communications at different range. For example, the IoT device 950 may communicate with close devices, e.g., within about 10 meters, using a local transceiver based on BLE, or another low power radio, to save power. More distant mesh devices 964. e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 966 may be included to communicate with devices or services in the cloud 900 via local or wide area network protocols. The wireless network transceiver 966 may be a LPWA transceiver that follows the IEEE 802.15.4, or IEEE 802.15.4g standards, among others. The IoT device 950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 962 and wireless network transceiver 966, as described herein. For example, the radio transceivers 962 and 966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 962 and 966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 968 may be included to provide a wired communication to the cloud 900 or to other devices, such as the mesh devices 964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to enable connect to a second network, for example, a NIC 968 providing communications to the cloud over Ethernet, and a second NIC 968 providing communications to other devices over another type of network.

Given the variety of types of applicable communications from the device to another component or network, applicable communications circuitry used by the device may include or be embodied by any one or more of components 962, 966, 968, or 970. Accordingly, in various examples, applicable means for communicating (e.g., receiving, transmitting, etc.) may be embodied by such communications circuitry.

The interconnect 956 may couple the processor 952 to an external interface 970 that is used to connect external devices or subsystems. The external devices may include sensors 972, such as accelerometers, level sensors, flow sensors, optical light sensors, camera sensors temperature sensors, a global positioning system (GPS) sensors, pressure sensors, barometric pressure sensors, and the like. The external interface 970 further may be used to connect the IoT device 950 to actuators 974, such as power switches, valve actuators, an audible sound generator, a visual warning device, and the like.

In some optional examples, various input/output (I/O) devices may be present within, or connected to, the IoT device 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 950.

A battery 976 may power the IoT device 950, although in examples in which the IoT device 950 is mounted in a fixed location, it may have a power supply coupled to an electrical grid. The battery 976 may be a lithium ion battery, or a metal-air battery, such as a zinc-air battery, an aluminum-air battery, a lithium-air battery, and the like.

A battery monitor/charger 978 may be included in the IoT device 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 978 may communicate the information on the battery 976 to the processor 952 over the interconnect 956. The battery monitor/charger 978 may also include an analog-to-digital (ADC) convertor that enables the processor 952 to directly monitor the voltage of the battery 976 or the current flow from the battery 976. The battery parameters may be used to determine actions that the IoT device 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the IoT device 950. A wireless battery charging circuit, such as an LTC4020 chip from Linear Technologies of Milpitas, California, among others, may be included in the battery monitor/charger 978. The specific charging circuits chosen depend on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine readable medium 960 including code to direct the processor 952 to perform electronic operations in the IoT device 950. The processor 952 may access the non-transitory, machine readable medium 960 over the interconnect 956. For instance, the non-transitory, machine readable medium 960 may be embodied by devices described for the storage 958 or may include specific storage units such as optical disks, flash drives, or any number of other hardware devices. The non-transitory, machine-readable medium 960 may include instructions to direct the processor 952 to perform a specific sequence or flow of actions, for example, as described with respect to the flowchart(s) and block diagram(s) of operations and functionality depicted above.

In an example, the instructions 988 on the processor 952 (separately, or in combination with the instructions 988 of the machine readable medium 960) may configure execution or operation of a trusted execution environment (TEE) 990. In an example, the TEE 990 operates as a protected area accessible to the processor 952 to enable secure access to data and secure execution of instructions. Various implementations of the TEE 990, and an accompanying secure area in the processor 952 or the memory 954 may be provided, for instance, through use of Intel® Software Guard Extensions (SGX) or ARM® TrustZone® hardware security extensions. Intel® Management Engine (ME), or Intel® Converged Security Manageability Engine (CSME). Other aspects of security hardening, hardware roots-of-trust, and trusted or protected operations may be implemented in the device 950 through the TEE 990 and the processor 952.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: processing circuitry; and a memory device including instructions embodied thereon, wherein the instructions, which when executed by the processing circuitry, configure the processing circuitry to perform operations comprising: receiving a request for a credential resource in a Representation State Transfer (RESTful) communication; identifying the credential resource, the credential resource including a credential path that indicates a dependency associated with a credential; identifying dependency characteristics of the credential resource, based on the dependency indicated in the credential path; populating the credential resource to include, a dependent credential, based on the dependency characteristics; and transmitting the populated credential resource in response to the request.

In Example 2, the subject matter of Example 1 includes, the operations of identifying the dependency characteristics of the credential resource further including: identifying a plurality of credential dependencies indicated in the credential path; wherein the credential path includes references to respective credentials of the credential dependencies.

In Example 3, the subject matter of Examples 1-2 includes, the dependency characteristics being produced based on an end-entity credential depending on a sub-certificate authority credential and the sub-certificate authority credential depending on a root-certificate authority credential.

In Example 4, the subject matter of Examples 1-3 includes, the request for the credential resource including a query for the credential path, wherein the dependent credential included in the credential resource is selected based on the query.

In Example 5, the subject matter of Examples 1-4 includes, the dependency characteristics including reason properties for respective dependent credentials, wherein the reason properties indicate an intended use and format of the respective dependent credentials.

In Example 6, the subject matter of Examples 1-5 includes, the credential resource including an array including a plurality of credential entries, wherein the plurality of credential entries are linked to a plurality of credentials identified in the credential path.

In Example 7, the subject matter of Examples 1-6 includes, the credential resource being a collection resource that includes an array of credential resource links, wherein the respective credential resource links are linked to a plurality of credential identified in the credential path.

In Example 8, the subject matter of Examples 1-7 includes: establishing the credential resource, including establishing credential properties and establishing the credential path within the credential resource, wherein the credential path includes one or more paths defined for each of the credential properties.

In Example 9, the subject matter of Example 8 includes, establishing the credential path further including: identifying multiple link dependencies to trust anchor entries, and wherein the one or more paths define the multiple link dependencies to the trust anchor entries.

In Example 10, the subject matter of Examples 1-9 includes, the credential resource including an end-entity key, wherein the dependency indicated in the credential path is linked to a trusted computing key of a trusted computing module that attests to trust properties of the end-entity key.

In Example 11, the subject matter of Examples 1-10 includes, the operations being performed as operations of a Credential Management Service (CMS), wherein the CMS operates according to an Open Connectivity Foundation (OCF) specification.

Example 12 is a method for accessing credential resource dependencies using operations performed by a device comprising: receiving a request for a credential resource in a Representation State Transfer (RESTful) communication; identifying the credential resource, the credential resource including a credential path that indicates a dependency associated with a credential; identifying dependency characteristics of the credential resource, based on the dependency indicated in the credential path; populating the credential resource to include, a dependent credential, based on the dependency characteristics; and transmitting the populated credential resource in response to the request.

In Example 13, the subject matter of Example 12 includes, identifying the dependency characteristics of the credential resource further including: identifying a plurality of credential dependencies indicated in the credential path; wherein the credential path includes references to respective credentials of the credential dependencies.

In Example 14, the subject matter of Examples 12-13 includes, the dependency characteristics being produced based on an end-entity credential depending on a sub-certificate authority credential and the sub-certificate authority credential depending on a root-certificate authority credential.

In Example 15, the subject matter of Examples 12-14 includes, the request for the credential resource including a query for the credential path, and wherein the dependent credential included in the credential resource is selected based on the query.

In Example 16, the subject matter of Examples 12-15 includes, the dependency characteristics including reason properties for respective dependent credentials, wherein the reason properties indicate an intended use and format of the respective dependent credentials.

In Example 17, the subject matter of Examples 12-16 includes, the credential resource including an array including a plurality of credential entries, wherein the plurality of credential entries are linked to a plurality of credentials identified in the credential path.

In Example 18, the subject matter of Examples 12-17 includes, the credential resource being a collection resource that includes an array of credential resource links, wherein the respective credential resource links are linked to a plurality of credential identified in the credential path.

In Example 19, the subject matter of Examples 12-18 includes: establishing the credential resource, including establishing credential properties and establishing the credential path within the credential resource, wherein the credential path includes one or more paths defined for each of the credential properties.

In Example 20, the subject matter of Example 19 includes, establishing the credential path further including, identifying multiple link dependencies to trust anchor entries, wherein the one or more paths define the multiple link dependencies to the trust anchor entries.

In Example 21, the subject matter of Examples 12-20 includes, the credential resource including an end-entity key, wherein the dependency indicated in the credential path is linked to a trusted computing key of a trusted computing module that attests to trust properties of the end-entity key.

In Example 22, the subject matter of Examples 12-21 includes, the operations being performed as operations of a Credential Management Service (CMS), wherein the CMS operates according to an Open Connectivity Foundation (OCF) specification.

Example 23 is a machine-readable storage medium including instructions, wherein the instructions, when executed by a processing circuitry of a device, cause the processing circuitry to perform operations of any of Examples 12 to 22.

Example 24 is an apparatus, comprising: means for receiving a request for a credential resource in a Representation State Transfer (RESTful) communication; means for identifying the credential resource, the credential resource including a credential path that indicates a dependency associated with a credential; means for identifying dependency characteristics of the credential resource, based on the dependency indicated in the credential path; means for populating the credential resource to include, a dependent credential, based on the dependency characteristics; and means for transmitting the populated credential resource in response to the request.

In Example 25, the subject matter of Example 24 includes, means for identifying a plurality of credential dependencies indicated in the credential path; wherein the credential path includes references to respective credentials of the credential dependencies.

In Example 26, the subject matter of Examples 24-25 includes, the dependency characteristics being produced based on an end-entity credential depending on a sub-certificate authority credential and the sub-certificate authority credential depending on a root-certificate authority credential.

In Example 27, the subject matter of Examples 24-26 includes, the request for the credential resource including a query for the credential path, wherein the dependent credential included in the credential resource is selected based on the query.

In Example 28, the subject matter of Examples 24-27 includes, means for accessing the dependency characteristics, wherein the dependency characteristics include reason properties for respective dependent credentials, and wherein the reason properties indicate an intended use and format of the respective dependent credentials.

In Example 29, the subject matter of Examples 24-28 includes, means for accessing the credential resource, wherein the credential resource includes an array including a plurality of credential entries, and wherein the plurality of credential entries are linked to a plurality of credentials identified in the credential path.

In Example 30, the subject matter of Examples 24-29 includes, means for accessing the credential resource, wherein the credential resource is a collection resource that includes an array of credential resource links, and wherein the respective credential resource links are linked to a plurality of credential identified in the credential path.

In Example 31, the subject matter of Examples 24-30 includes, means for establishing the credential resource, including establishing credential properties and establishing the credential path within the credential resource, wherein the credential path includes one or more paths defined for each of the credential properties.

In Example 32, the subject matter of Example 31 includes, means for identifying multiple link dependencies to trust anchor entries, wherein the one or more paths define the multiple link dependencies to the trust anchor entries.

In Example 33, the subject matter of Examples 24-32 includes, means for identifying trusted computing properties, wherein the credential resource includes an end-entity key, and wherein the dependency indicated in the credential path is linked to a trusted computing key of a trusted computing module that attests to trust properties of the end-entity key.

In Example 34, the subject matter of Examples 24-33 includes, means for executing operations of a Credential Management Service (CMS), and wherein the CMS operates according to an Open Connectivity Foundation (OCF) specification.

Example 35 is an IoT services platform adapted to perform the operations of any of Examples 1 to 34.

Example 35 is a fog platform adapted to perform the operations of any of Examples 1 to 34.

Example 36 is an Open Connectivity Foundation (OCF) device, configured as a server, client, or intermediary according to an OCF specification, comprising means to implement the operations of any of Examples 1 to 34.

Example 37 is a device owner transfer service management service adapted to perform the operations invoked by any of Examples 1 to 34.

Example 38 is a credential management service adapted to perform the operations invoked by any of Examples 1 to 34.

Example 39 is an Internet of Things (IoT) network topology, the IoT network topology comprising respective communication links adapted to perform communications for the operations of any of Examples 1 to 34.

Example 40 is a network comprising respective devices and device communication mediums for performing any of the operations of Examples 1 to 34.

Example 41 is an edge cloud computing device implementation comprising processing nodes and computing units adapted for performing any of the operations of Examples 1 to 34.

Example 42 is an edge cloud network platform comprising physical and logical computing resources adapted for performing any of the operations of Examples 1 to 34.

Example 43 is an apparatus comprising means for performing any of the operations of Examples 1 to 34.

Example 44 is a system to perform the operations of any of Examples 1 to 44.

The operations and functionality described above in these examples, and in the specific embodiments described with reference to FIGS. 3 to 7, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system. Further combinations which follow these shared, distributed, or grouping principles, as suggested in the examples and configurations above, can be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device, comprising:
   processing circuitry; and
   a memory device including instructions embodied thereon, wherein the instructions, which when executed by the processing circuitry, configure the processing circuitry to perform operations comprising:
   receiving a request for a credential resource;
   identifying the credential resource stored at a first location, the credential resource comprising data that includes at least one authentication credential and a credential path that indicates a dependency to an entity at a second location associated with the at least one authentication credential, wherein the credential path links to at least one dependent authentication credential at the second location, and wherein the respective authentication credentials comprise a key or a certificate used to attest to one or more trust properties;
   identifying dependency characteristics of the credential resource, based on the dependency indicated in the credential path;
   retrieving the at least one dependent authentication credential from the second location indicated in the credential path, wherein the at least one dependent authentication credential is retrieved based on a type of the dependency and at least one trust anchor specified by the credential path;
   populating the credential resource to include data from the at least one dependent authentication credential, wherein the at least one dependent authentication credential is populated in the credential resource based on the dependency characteristics including a use and format of the at least one dependent authentication credential; and transmitting the populated credential resource in response to the request; wherein the credential resource includes an end-entity key, and wherein the dependency indicated in the credential path is linked to a trusted computing key of a trusted computing module that attests to trust properties of the end-entity key.

2. The device of claim 1, wherein the operations of identifying the dependency characteristics of the credential resource include:
 identifying a plurality of credential dependencies indicated in the credential path;
 wherein the credential path includes references to respective authentication credentials of the plurality of credential dependencies.

3. The device of claim 1, wherein the at least one authentication credential comprises at least one certificate, and wherein the dependency characteristics are produced based on an end-entity credential depending on a sub-certificate authority credential and the sub-certificate authority credential depending on a root-certificate authority credential.

4. The device of claim 1, wherein the request for the credential resource includes a query for the credential path, and wherein the at least one dependent authentication credential populated in the credential resource is selected based on the query.

5. The device of claim 1, wherein the dependency characteristics include reason properties for respective dependent authentication credentials, and wherein the reason properties indicate the use and format of the respective dependent authentication credentials.

6. The device of claim 1, wherein the credential resource includes an array including a plurality of credential entries, and wherein the plurality of credential entries are linked to a plurality of credentials identified in the credential path.

7. The device of claim 1, wherein the credential resource is a collection resource that includes an array of credential resource links, and wherein the respective credential resource links are linked to a plurality of credentials identified in the credential path.

8. The device of claim 1, the operations further comprising:
 establishing the credential resource, including establishing credential properties and establishing the credential path within the credential resource, wherein the credential path includes one or more paths defined for each of the credential properties.

9. The device of claim 8, wherein the operations of establishing the credential path include identifying multiple link dependencies to respective trust anchor entries, and wherein the one or more paths define the multiple link dependencies to the respective trust anchor entries.

10. The device of claim 1, wherein the operations are performed as operations of a Credential Management Service (CMS), and wherein the CMS operates according to an Open Connectivity Foundation (OCF) specification.

11. A method for accessing credential resource dependencies using operations performed by a device comprising:
 receiving a request for a credential resource;
 identifying the credential resource stored at a first location, the credential resource comprising data that includes at least one authentication credential and a credential path that indicates a dependency to an entity at a second location associated with the at least one authentication credential, wherein the credential path links to at least one dependent credential at the second location, and wherein the respective authentication credentials comprise a key or a certificate used to attest to one or more trust properties;
 identifying dependency characteristics of the credential resource, based on the dependency indicated in the credential path;
 retrieving the at least one dependent authentication credential from the second location indicated in the credential path, wherein the at least one dependent authentication credential is retrieved based on a type of the dependency and at least one trust anchor specified by the credential path;
 populating the credential resource to include data from the at least one dependent authentication credential, wherein the at least one dependent authentication credential is populated in the credential resource based on the dependency characteristics including a use and format of the at least one dependent authentication credential; and
 transmitting the populated credential resource in response to the request; wherein the credential resource includes an end-entity key, and wherein the dependency indicated in the credential path is linked to a trusted computing key of a trusted computing module that attests to trust properties of the end-entity key.

12. The method of claim 11, wherein the operations of identifying the dependency characteristics of the credential resource include:
 identifying a plurality of credential dependencies indicated in the credential path;
 wherein the credential path includes references to respective authentication credentials of the plurality of credential dependencies.

13. The method of claim 11, wherein the at least one authentication credential comprises at least one certificate, and wherein the dependency characteristics are produced based on an end-entity credential depending on a sub-certificate authority credential and the sub-certificate authority credential depending on a root-certificate authority credential.

14. The method of claim 11, wherein the request for the credential resource includes a query for the credential path, and wherein the at least one dependent authentication credential populated in the credential resource is selected based on the query.

15. The method of claim 11, wherein the dependency characteristics include reason properties for respective dependent authentication credentials, and wherein the reason properties indicate the use and format of the respective dependent authentication credentials.

16. The method of claim 11, wherein the credential resource includes an array including a plurality of credential entries, and wherein the plurality of credential entries are linked to a plurality of credentials identified in the credential path.

17. The method of claim 11, wherein the credential resource is a collection resource that includes an array of credential resource links, and wherein the respective credential resource links are linked to a plurality of credential identified in the credential path.

18. The method of claim 11, the operations further comprising:
 establishing the credential resource, including establishing credential properties and establishing the credential path within the credential resource, wherein the credential path includes one or more paths defined for each of the credential properties.

19. The method of claim 18, wherein the operations of establishing the credential path include identifying multiple link dependencies to trust anchor entries, wherein the one or more paths define the multiple link dependencies to the trust anchor entries.

20. The method of claim 11, wherein the operations are performed as operations of a Credential Management Service (CMS), and wherein the CMS operates according to an Open Connectivity Foundation (OCF) specification.

21. At least one non-transitory machine-readable storage medium including instructions, wherein the instructions, when executed by a processing circuitry of a device, cause the processing circuitry to perform operations comprising:

receiving a request for a credential resource;

identifying the credential resource stored at a first location, the credential resource comprising data that includes at least one authentication credential and a credential path that indicates a dependency to an entity at a second location associated with the at least one authentication credential, wherein the credential path links to at least one dependent credential at the second location, and wherein the respective authentication credentials comprise a key or a certificate used to attest to one or more trust properties;

identifying dependency characteristics of the credential resource, based on the dependency indicated in the credential path;

retrieving the at least one dependent authentication credential from the second location indicated in the credential path, wherein the at least one dependent authentication credential is retrieved based on a type of the dependency and at least one trust anchor specified by the credential path;

populating the credential resource to include data from the at least one dependent authentication credential, wherein the at least one dependent authentication credential is populated in the credential resource based on the dependency characteristics including a use and format of the at least one dependent authentication credential; and transmitting the populated credential resource in response to the request; wherein the credential resource includes an end-entity key, and wherein the dependency indicated in the credential path is linked to a trusted computing key of a trusted computing module that attests to trust properties of the end-entity key.

22. The machine-readable storage medium of claim 21, the operations further comprising:

identifying a plurality of credential dependencies indicated in the credential path;

wherein the credential path includes references to respective authentication credentials of the plurality of credential dependencies.

23. The machine-readable storage medium of claim 21, wherein the device is operable for executing the operations as a function of a Credential Management Service (CMS), and wherein the CMS operates according to an Open Connectivity Foundation (OCF) specification.

* * * * *